US012799377B2

(12) United States Patent
Abe et al.

(10) Patent No.: US 12,799,377 B2
(45) Date of Patent: Nov. 17, 2026

(54) 2-COMPONENT TYPE URETHANE-BASED ADHESIVE COMPOSITION

(71) Applicants: SIKA TECHNOLOGY AG, Baar (CH); TOYOTA JIDOSHA KABUSHIKI KAISHA, Toyota (JP)

(72) Inventors: Megumi Abe, Hiratsuka (JP); Yuichi Matsuki, Hiratsuka (JP); Yasuyuki Suzuki, Toyota (JP)

(73) Assignees: SIKA TECHNOLOGY AG, Baar (CH); TOYOTA JIDOSHA KABUSHIKI KAISHA, Toyota (JP)

( * ) Notice: Subject to any disclaimer, the term of this patent is extended or adjusted under 35 U.S.C. 154(b) by 505 days.

(21) Appl. No.: 18/288,290

(22) PCT Filed: Apr. 26, 2022

(86) PCT No.: PCT/JP2022/018868
§ 371 (c)(1),
(2) Date: Oct. 25, 2023

(87) PCT Pub. No.: WO2022/230869
PCT Pub. Date: Nov. 3, 2022

(65) Prior Publication Data

US 2024/0218219 A1 Jul. 4, 2024

(30) Foreign Application Priority Data

Apr. 30, 2021 (JP) ................................ 2021-077551

(51) Int. Cl.
*C09J 175/08* (2006.01)
*C09J 11/04* (2006.01)
*C09J 11/08* (2006.01)

(52) U.S. Cl.
CPC ............ *C09J 175/08* (2013.01); *C09J 11/04* (2013.01); *C09J 11/08* (2013.01)

(58) Field of Classification Search
CPC ............ C09J 175/08; C09J 11/04; C09J 11/08
USPC .......................................................... 523/218
See application file for complete search history.

(56) References Cited

U.S. PATENT DOCUMENTS

2018/0320037 A1* 11/2018 Franken ............ C08G 18/4238
2022/0041908 A1 2/2022 Abe et al.

FOREIGN PATENT DOCUMENTS

CA 3 010 144 A1 7/2017
JP 2015-52228 A 3/2015
JP 2016125045 A * 7/2016
WO 2020/158289 A1 8/2020

OTHER PUBLICATIONS

Sep. 5, 2024 Extended Search Report issued in European Patent Application No. 22795782.6.
Oct. 24, 2023 International Preliminary Report on Patentability issued in International Patent Applicaiton No. PCT/JP2022/018868.

* cited by examiner

*Primary Examiner* — Robert S Jones, Jr.
*Assistant Examiner* — Elizabeth Amato
(74) *Attorney, Agent, or Firm* — Oliff PLC

(57) ABSTRACT

A 2-component type urethane-based adhesive composition that exhibits excellent workability, excellent mechanical discharge properties and excellent heat-resistant adhesive properties. This 2-component type urethane-based adhesive composition contains: a main agent, which contains a urethane prepolymer (A) having an isocyanate group at a terminal, a compound (B) having an isocyanurate ring, and a silane coupling agent (C); and a curing agent, which contains a compound having two or more active hydrogen-containing groups per molecule. The main agent or the curing agent also contains a hollow body (E) having a pressure resistance strength of 10 MPa or more.

8 Claims, No Drawings

2-COMPONENT TYPE URETHANE-BASED ADHESIVE COMPOSITION

TECHNICAL FIELD

The present invention relates to a two-component urethane-based adhesive composition.

BACKGROUND ART

Two-component types of urethane-based adhesive compositions have conventionally been proposed as adhesives and sealants for automobiles, construction, and structural purposes (see Patent Document 1, for example).

PRIOR ART DOCUMENTS

Patent Documents

Patent Document 1: International Publication WO2020/158289

SUMMARY OF THE INVENTION

Problems to be Solved by the Invention

Currently increasing demand for performance and safety in a variety of fields, including the automobile industry, has been accompanied by demand for better performance of the two-component types of urethane-based adhesive compositions that are used in those fields. There has been particular demand for better adhesion even after prolonged exposure to environments involving elevated temperatures (heat-resistant adhesion). There is also demand for better workability. There is furthermore demand for less change in specific gravity when dispensed by a machine (better machine dispensability).

Against this background, the preparation of two-component urethane-based adhesive compositions and analysis of their performance by the present inventors with reference to Patent Document 1 revealed that further improvements were needed, given the probability of ever-increasing demand in the future.

Accordingly, an object of the prevent invention, in view of the foregoing, is to provide a two-component type of urethane-based adhesive composition that would have better workability, better machine dispensability, and better heat-resistant adhesion.

Means for Solving the Problems

As a result of extensive research on behalf of the above object, the inventors arrived at the present invention upon discovering that the above problems can be solved by blending hollow bodies that have a compressive strength within a certain range.

Specifically, the inventors discovered that the above problems could be solved by means of the following:

(1) a two-component type of urethane-based adhesive composition, comprising:

- a principal agent comprising a urethane prepolymer (A) that has a terminal isocyanate group; a compound (B) that has an isocyanurate ring; and a silane coupling agent (C); and
- a curing agent comprising a compound (D) that has 2 or more active hydrogen-containing groups per molecule, wherein
- the above principal agent or curing agent further comprises hollow bodies (E) having a compressive strength of 10 MPa or more;

(2) the two-component type of urethane-based adhesive composition according to (1) above, wherein the content of the hollow bodies (E) is 0.05 to 5% by mass relative to the entire composition;

(3) the two-component type of urethane-based adhesive composition according to (1) or (2) above, wherein the compound (B) is an isocyanurate of an aliphatic isocyanate;

(4) the two-component type of urethane-based adhesive composition according to any of (1) through (3) above, wherein the urethane prepolymer (A) is obtained by mixing and reacting a polyether polyol that has a molecular weight of 500 to 20,000 with an aromatic polyisocyanate, where the proportion of the isocyanate groups of the aromatic polyisocyanate ranges from 1.5 to 2.5 mols per mol of the polyether polyol hydroxyl groups; and (5) the two-component type of urethane-based adhesive composition according to any of (1) through (4) above, wherein the principal agent or curing agent furthermore comprises carbon black or calcium carbonate.

Effect of the Invention

As will be shown below, the present invention can provide a two-component type of urethane-based adhesive composition that has better workability, better machine dispensability, and better heat-resistant adhesion.

MODES FOR CARRYING OUT THE INVENTION

The two-component urethane-based adhesive composition of the present invention is described below.

As used in the specification of the present invention, numerical ranges represented with a hyphen indicate a range where the numerical values before and after the hyphen indicate the minimum and maximum values, respectively.

In the present specification, components can be used alone or in combinations of two or more. When components are used in combinations of two or more, the content indicates the total content, unless otherwise specified.

The expression "the effects of the present invention will be better" means that the workability will be better, the machine dispensability will be better, and the adhesion (heat-resistant adhesion, in particular) will be better.

The two-component type of urethane-based adhesive composition of the present invention (sometimes referred to as "the composition of the present invention") comprises:

- a principal agent comprising a urethane prepolymer (A) that has a terminal isocyanate group; a compound (B) that has an isocyanurate ring; and a silane coupling agent (C); and
- a curing agent comprising a compound (D) that has 2 or more active hydrogen-containing groups per molecule, wherein
- the above principal agent or curing agent further comprises hollow bodies (E) having a compressive strength of 10 MPa or more.

As the composition of the present invention has the features noted above, the problems noted above are considered to be solved by the present invention, as intended. Although the reasons for this are not yet fully understood, a feature of the composition of the present invention is considered to be the fact that the principal agent or curing agent contains hollow bodies (hollow bodies (E)) that have a compressive strength of 10 MPa or more. Specifically, the addition of hollow bodies (hollow bodies (E)) to the adhesive is thought to moderately suppress the viscosity of the polymer components of the adhesive, resulting in less stringiness (better workability). It appears that, even after prolonged exposure to environments involving elevated temperatures, any stress that acts on the adhesive layer is dispersed through the hollow bodies (hollow bodies (E)) and the polymer layer adjacent to the hollow bodies (hollow bodies (E)), without becoming concentrated in the interface between the adhesive layer and the surface of the adherence, thus affording better adhesion (heat-resistant adhesion). As will be shown in Comparative Examples 2 and 3 below, the use of hollow bodies having a compressive strength of less than 10 MPa instead of the hollow bodies (E) results in poor machine dispensability.

[Principal Agent]

In the composition of the present invention, the principal agent comprises a urethane prepolymer (A) that has a terminal isocyanate group; a compound (B) that has an isocyanurate ring; and a silane coupling agent (C).

The components of the principal agent are described below.

[Urethane Prepolymer (A)]

The urethane prepolymer (A) is not particularly limited, provided that it is a urethane prepolymer that has a terminal isocyanate group.

In a preferred embodiment, the urethane prepolymer (A) contains two or more terminal isocyanate groups per molecule.

Conventionally well-known prepolymers can be used as the urethane prepolymer (A).

Because the effects of the present invention will be better, the urethane prepolymer (A) is preferably obtained by allowing a polyisocyanate to be reacted with a compound having two or more active hydrogen-containing groups per molecule (also referred to as “active hydrogen compound” below) in a way that results in an excess of isocyanate groups relative to the active hydrogen-containing groups.

As used in the present invention, active hydrogen-containing groups means groups that contain active hydrogen. Examples of active hydrogen-containing groups include hydroxy, amino, and imino groups.

<Polyisocyanate>

The polyisocyanate that is used to produce the urethane prepolymer (A) is not particularly limited, provided that it has two or more isocyanate groups per molecule.

Examples of polyisocyanates include aromatic polyisocyanates such as tolylene diisocyanates (TDI, such as 2,4-tolylene diisocyanate and 2,6-tolylene diisocyanate), diphenylmethane diisocyanates (MDI, such as 4,4'-diphenylmethane diisocyanate and 2,4'-diphenylmethane diisocyanate), 1,4-phenylene diisocyanate, polymethylene polyphenylene polyisocyanate, xylylene diisocyanate (XDI), tetramethylxylylene diisocyanate (TMXDI), tolidine diisocyanate (TODI), 1,5-naphthalene diisocyanate (NDI), and triphenylmethane triisocyanate; aliphatic and/or alicyclic polyisocyanates such as hexamethylene diisocyanate (HDI), trimethylhexamethylene diisocyanate (TMHDI), lysine diisocyanate, norbornane diisocyanate (NBDI), transcyclohexane-1,4-diisocyanate, isophorone diisocyanate (IPDI), bis(isocyanatomethyl)cyclohexane ($H_6$XDI), and dicyclohexylmethane diisocyanate ($H_{12}$MDI); and carbodiimide-modified polyisocyanates thereof, isocyanurate-modified polyisocyanates thereof, and allophanate-modified products thereof.

Because the effects of the present invention will be better, the polyisocyanate is preferably an aromatic polyisocyanate, and more preferably MDI.

The polyisocyanates may be used alone or in combinations of two or more.

<Active Hydrogen Compound>

The compound having two or more active hydrogen-containing groups per molecule (active hydrogen compound) that is used to produce the urethane prepolymer (A) is not particularly limited. Examples of active hydrogen-containing groups include hydroxy (OH), amino, and imino groups.

Examples of the active hydrogen compound include polyols that have two or more hydroxyl (OH) groups per molecule, and polyamine compounds having two or more amino groups and/or imino groups per molecule. Of these, polyols are preferred.

The polyol is not particularly limited, provided that it is a compound having two or more OH groups. Specific examples of polyols include polyether polyols; polyester polyols; (meth)acrylic polyols; polybutadiene polyols and hydrogenated polybutadiene polyols; low molecular polyhydric alcohols; and mixtures thereof. Polyether polyols are a preferred embodiment because the effects of the present invention will be better.

The polyether polyol is not particularly limited, provided that it is a compound having a polyether main chain and two or more OH groups. A polyether is a group having two or more ether bonds, specific examples of which include groups having a total of two or more structural units —$R^a$—O—$R^b$—. Here, $R^a$ and $R^b$ in the above structural unit each independently represent a hydrocarbon group. The hydrocarbon is not particularly limited. Examples include $C_{1-10}$ linear alkylene groups.

Examples of polyether polyols include polyoxyethylene diol (polyethylene glycol), polyoxypropylene diol (polypropylene glycol: PPG), polyoxypropylene triol, ethylene oxide/propylene oxide copolymer polyols, polytetramethylene ether glycol (PTMEG), polytetraethylene glycol, and sorbitol polyols.

In the interests of better compatibility with polyisocyanates, the polyether polyol is preferably polypropylene glycol or polyoxypropylene triol.

Because the effects of the present invention will be better, the molecular weight of the polyether polyol polyisocyanate is preferably 500 to 20,000.

In the present specification, the molecular weight of the polyol is determined on the basis of the hydroxyl value, and is specifically determined as (56,100/hydroxyl value)×average number of functional groups.

Here, the hydroxyl value, as described in JIS K 1557-1:2007, is the number of mg of potassium hydroxide equivalent to the hydroxyl groups in 1 g of a sample. The average number of functional groups is the average number of hydroxyl groups per polyol molecule.

Active hydrogen compounds may be used alone or in combinations of two or more.

PREFERRED EMBODIMENTS

Because the effects of the present invention will be better, the urethane prepolymer (A) is preferably obtained by reacting a polyether polyol with an aromatic polyisocyanate.

When the urethane prepolymer (A) is obtained by reacting a polyisocyanate with a polyol, the molar ratio of the isocyanate groups of the polyisocyanate to the hydroxyl groups of the polyol (NCO/OH) is preferably 1.5-2.5 because the effects of the present invention will be better.

Because the effects of the present invention will be better, the urethane prepolymer (A) is preferably obtained by mixing and reacting a polyether polyol that has a molecular weight of 500 to 20,000 with an aromatic polyisocyanate, where the proportion of the isocyanate groups of the aromatic polyisocyanate ranges from 1.5-2.5 mols (specifically, NCO/OH=1.5 to 2.5) per mol of the polyether polyol hydroxyl groups.

<Content>

In the composition of the present invention, the content of the urethane prepolymer (A) is preferably 10 to 95% by mass, and more preferably 20 to 60% by mass, relative to the total composition, because the effects of the present invention will be better.

In the composition of the present invention, the content of the urethane prepolymer (A) is preferably 10 to 95% by mass, and more preferably 30 to 70% by mass, relative to the total of the principal agent, because the effects of the present invention will be better.

[Compound (B)]

The compound (B) is not particularly limited, provided that it has an isocyanurate ring.

Because the effects of the present invention will be better, compound (B) is preferably an isocyanurate (nurate) of an isocyanate.

Because the effects of the present invention will be better, the isocyanate is preferably a polyisocyanate. Specific examples of polyisocyanates are noted above.

Because the effects of the present invention will be better, the polyisocyanate is preferably an aliphatic isocyanate, more preferably an aliphatic polyisocyanate, and even more preferably an aliphatic diisocyanate.

<Content>

In the composition of the present invention, the content of compound (B) is preferably 0.1 to 10% by mass, and more preferably 0.5 to 5% by mass, relative to the total composition, because the effects of the present invention will be better.

In the composition of the present invention, the content of compound (B) is preferably 0.1 to 10% by mass, and more preferably 0.5 to 5% by mass, relative to the total of the principal agent, because the effects of the present invention will be better.

In the composition of the present invention, the content of compound (B) is preferably 1 to 20% by mass, and more preferably 2 to 10% by mass, relative to the total content of the urethane prepolymer (A) noted above, because the effects of the present invention will be better.

[Silane Coupling Agent (C)]

The silane coupling agent (C) is not particularly limited, provided that it is a silane compound having a hydrolyzable group and an organic functional group. Compounds having a hydrolyzable silyl group (in particular, a hydrocarbyloxysilyl group) and an organic functional group are preferred because the effects of the present invention will be better.

The silane coupling agent (C) also does not have an isocyanurate ring.

Examples of hydrolyzable groups include, but are not particularly limited to, alkoxy groups, phenoxy groups, carboxyl groups, and alkenyloxy groups. Of these, alkoxy groups are preferred because the effects of the present invention will be better. When the hydrolyzable group is an alkoxy group, the number of carbons in the alkoxy group is preferably 1-16, and more preferably 1-4, because the effects of the present invention will be better. Examples of $C_{1-4}$ alkoxy groups include methoxy, ethoxy, and propoxy groups.

Preferred examples of organic functional groups include, but are not particularly limited to, groups capable of forming a chemical bond with an organic compound, such as epoxy groups, vinyl groups, acryloyl groups, methacryloyl groups, amino groups, sulfide groups (in particular, polysulfide groups (—$S_n$—: where n is an integer of 2 or more)), mercapto groups, blocked mercapto groups (protected mercapto groups) (such as octanoylthio groups), and isocyanate groups, among which isocyanate groups are preferred because the effects of the present invention will be better.

Because the effects of the present invention will be better, the silane coupling agent (C) is preferably an isocyanate silane, an aminoalkoxy silane, a mercapto alkoxy silane, or a monosulfide compound having a monosulfide bond and a hydrolyzable silyl group.

<Isocyanate Silanes>

Isocyanate silanes are silane compounds that have an isocyanate group and a hydrolyzable group. Compounds having an isocyanate group and a hydrolyzable silyl group (in particular, a hydrocarbyloxysilyl group) are preferred because the effects of the present invention will be better.

Because the effects of the present invention will be better, isocyanate silanes are preferably compounds obtained by reacting an isocyanate with a silane coupling agent.

Because the effects of the present invention will be better, the isocyanate is preferably a polyisocyanate. Specific examples of polyisocyanates are noted above.

Because the effects of the present invention will be better, the polyisocyanate is preferably an aliphatic isocyanate, more preferably an aliphatic polyisocyanate, and even more preferably an aliphatic diisocyanate.

Because the effects of the present invention will be better, the isocyanate is preferably a biuret or an allophanate of an aliphatic polyisocyanate, and even more preferably a biuret of an aliphatic polyisocyanate (in particular, an aliphatic diisocyanate).

<Content>

In the composition of the present invention, the content of the silane coupling agent (C) is preferably 0.1 to 10% by mass, and more preferably 0.5 to 5% by mass, relative to the total composition, because the effects of the present invention will be better.

In the composition of the present invention, the content of the silane coupling agent (C) is preferably 0.1 to 10% by mass, and more preferably 0.5 to 5% by mass, relative to the total of the principal agent, because the effects of the present invention will be better.

In the composition of the present invention, the content of the silane coupling agent (C) is preferably 0.1 to 20% by mass, and more preferably 1 to 10% by mass, relative to the total content of the urethane prepolymer (A) noted above, because the effects of the present invention will be better.

[Curing Agent]

In the composition of the present invention, the curing agent comprises a compound (D) that contains 2 or more active hydrogen-containing groups per molecule.

[Compound (D)]

The compound (D) is not particularly limited, provided that it is a compound that has two or more active hydrogen-containing groups per molecule (active hydrogen compound). Specific examples and preferred embodiments of the active hydrogen compound are the same as those for the active hydrogen compound in the principal agent described above.

<Content>

In the composition of the present invention, the content of compound (D) is preferably 0.1 to 20% by mass, and more preferably 1 to 10% by mass, relative to the total composition, because the effects of the present invention will be better.

In the composition of the present invention, the content of compound (D) is preferably 10 to 95% by mass, and more preferably 50 to 80% by mass, relative to the total of the principal agent, because the effects of the present invention will be better.

In the composition of the present invention, the content of compound (D) is preferably 1 to 30% by mass, and more preferably 10 to 20% by mass, relative to the total content of the urethane prepolymer (A) noted above, because the effects of the present invention will be better.

[Hollow Bodies (E)]

As noted above, the above principal agent or above curing agent further comprises hollow bodies (E) having a compressive strength of 10 MPa or more. The above principal agent and the above curing agent may also both comprise the hollow bodies (E). The above curing agent preferably comprises the hollow bodies (E).

[Compressive Strength]

As noted above, the hollow bodies (E) have a compressive strength of 10 MPa or more. Because the effects of the present invention will be better, the compressive strength is preferably 15 MPa or more, more preferably 18 MPa or more, even more preferably 20 MPa or more, and still more preferably 25 MPa or more. The upper limit of the compressive strength is not particularly limited, but is preferably no more than 100 MPa, and more preferably no more than 50 MPa, because the effects of the invention will be better.

As used in the present specification, the compressive strength is the pressure at which 10% by volume of a suitable amount of hollow bodies that have been placed in glycerin are destroyed, as determined in accordance with ASTM D 3102-78.

[Material]

The material of the hollow bodies (E) is not particularly limited but is preferably a resin, more preferably a polyester resin, and even more preferably a cross linked polyester resin, in order to ensure better effects in the present invention, a higher compressive strength, and less of a load on machines during machine dispensation. The material is preferably a resin, and more preferably a cross linked resin (thermosetting resin), in order to ensure better effects in the present invention, a higher compressive strength, and less of a load on machines during machine dispensation.

[Apparent Density]

The apparent density of the hollow bodies (E) is not particularly limited, but is preferably 0.1-10 g/cm$^3$, more preferably 0.2-1 g/cm$^3$, and even more preferably 0.3-0.5 g/cm$^3$.

The apparent density can be determined in accordance with JIS K 0061, JIS Z 8807, and JIS R5201.

[Bulk Density]

The bulk density of the hollow bodies (E) is not particularly limited, but is preferably 0.1-10 g/cm$^3$, and 0.2-0.5 g/cm$^3$ because the effects of the present invention will be better.

The bulk density can be determined in accordance with JIS Z 2504, JIS K 5101-12-2, and JIS R 1628.

[Average Particle Size]

The average particle size of the hollow bodies (E) is not particularly limited, but is preferably 1-500 μm, more preferably 10-100 μm, and even more preferably 30-80 μm, because the effects of the present invention will be better.

As used in the present specification, the average particle size is the volume average diameter determined by laser diffraction using a laser diffraction particle distribution analyzer.

[Structure]

Because the effects of the present invention will be better, the above-mentioned hollow bodies (E) are preferably porous, and are more preferably sponge-like structures in which numerous hollow portions are present in a cross linked resin (thermosetting resin). This sort of structure will have pressure resistance (heating at elevated temperatures, in some cases) that is better (will be elastic against pressure, and will be less likely to collapse).

[Production Method]

The method for producing the hollow bodies (E) is not particularly limited.

Examples of methods for ensuring that the hollow bodies have a compressive strength of 10 MPa or more include methods for ensuring that the material, apparent density, bulk density, average particle size, and structure are within the preferred ranges noted above.

Commercially available hollow bodies having a compressive strength of 10 MPa or more (such as Airpolic EY-01, manufactured by Shiraishi Kogyo Kaisha, Ltd.) can be used as the hollow bodies (E).

[Content]

In the composition of the present invention, the content of the hollow bodies (E) is preferably 0.05-5% by mass, and more preferably 0.1-1% by mass, relative to the total composition, because the effects of the present invention will be better.

In the composition of the present invention, the content of the hollow bodies (E) in the curing agent is preferably 0.1-20% by mass, and more preferably 0.5-10% by mass, relative to the total curing agent, because the effects of the present invention will be better.

In the composition of the present invention, the content of the hollow bodies (E) is preferably 0.1-10% by mass, and more preferably 0.5-5% by mass, relative to the content of the urethane prepolymer (A) noted above, because the effects of the present invention will be better.

In the composition of the present invention, the content of the hollow bodies (E) is preferably 1-100% by mass, and more preferably 5-50% by mass, relative to the content of the compound (B) noted above, because the effects of the present invention will be better.

In the composition of the present invention, the content of the hollow bodies (E) is preferably 5-150% by mass, and more preferably 20-100% by mass, relative to the content of the silane coupling agent (C) noted above, because the effects of the present invention will be better.

[Optional Components]

The composition of the present invention may contain components other than the components noted above (optional components). Whether optional components are added to the principal agent to or the curing agent can be selected, as appropriate.

Examples of optional components include various types of additives such as fillers other than the hollow bodies (E) noted above (such as carbon black and calcium carbonate), modified isocyanates other than compound (B) noted above (such as allophanates and biurets), catalysts (curing catalysts), plasticizers, anti-aging agents, antioxidants, pigments (dyes), tackifiers, terpene compounds such as terpineol, thixotropic agents, UV absorbers, flame retardants, surfactants (including leveling agents), dispersants, dehydrating agents, and antistatic agents.

Fillers may be surface-treated with, for example, at least one treating agent selected from the group consisting of fatty acids, resin acids, urethane compounds, and fatty acid esters.

The above principal agent or above curing agent preferably contains carbon black or calcium carbonate because the effects of the present invention will be better.

[Carbon Black]

The composition of the present invention preferably contains carbon black because the effects of the present invention will be better.

The carbon black is not particularly limited. Examples include SAF (Super Abrasion Furnace), ISAF (Intermediate Super Abrasion Furnace), HAF (High Abrasion Furnace), FEF (Fast Extruding Furnace), GPF (General Purpose Furnace), SRF (Semi-Reinforcing Furnace), FT (Fine Thermal), and MT (Medium Thermal).

Specifically, SEAST 9 (manufactured by Tokai Carbon Co., Ltd.) is an example of SAF; Showa Black N220 (manufactured by Showa Cabot K.K.) is an example of ISAF; SEAST 3 (manufactured by Tokai Carbon Co., Ltd.) and Niteron #200 (manufactured by NIPPON STEEL Carbon Co., Ltd.) are examples of HAF; and HTC #100 (manufactured by Chubu Carbon) is an example of FEF. Asahi #55 (manufactured by Asahi Carbon Co., Ltd.) and SEAST 5 (manufactured by Tokai Carbon Co., Ltd.) are examples of GPF; Asahi #50 (manufactured by Asahi Carbon Co., Ltd.) and Mitsubishi #5 (manufactured by Mitsubishi Chemical Co., Ltd.) are examples of SRF; Asahi Thermal (manufactured by Asahi Carbon Co., Ltd.) and HTC #20 (manufactured by Chubu Carbon) are examples of FT; and Asahi #15 (manufactured by Asahi Carbon Co., Ltd.) is an example of MT.

<Content>

In the composition of the present invention, the content of the carbon black is not particularly limited, but is preferably 5-50% by mass, and more preferably 10-30% by mass, relative to the total composition, because the effects of the present invention will be better.

In the composition of the present invention, the content of the carbon black is not particularly limited, but is preferably 30-70% by mass, and more preferably 40-60% by mass, relative to the content of the urethane prepolymer (A) noted above, because the effects of the present invention will be better.

[Calcium Carbonate]

The composition of the present invention preferably contains calcium carbonate because the effects of the present invention will be better. The calcium carbonate is not a composite and does not contain the composite filler (E) noted above.

The calcium carbonate is not particularly limited. Examples include heavy calcium carbonate, precipitated calcium carbonate (light calcium carbonate), and colloidal calcium carbonate.

<Content>

In the composition of the present invention, the content of the calcium carbonate is not particularly limited, but is preferably 5-50% by mass, and more preferably 10-30% by mass, relative to the total composition, because the effects of the present invention will be better.

In the composition of the present invention, the content of the calcium carbonate is not particularly limited, but is preferably 5-100% by mass, and more preferably 30-60% by mass, relative to the content of the urethane prepolymer (A) noted above, because the effects of the present invention will be better.

[Plasticizer]

The composition of the present invention preferably contains a plasticizer because the effects of the present invention will be better.

Specific examples of plasticizers include diisononyl phthalate (DINP); dioctyl adipate, isodecyl succinate; diethylene glycol dibenzoate, pentaerythritol esters; butyl oleate, methyl acetyl ricinoleate; tricresyl phosphate, trioctyl phosphate; and propylene glycol adipate polyesters, and butylene glycol adipate polyesters; these can be used alone or in combinations of two or more.

<Content>

In the composition of the present invention, the content of the plasticizer is not particularly limited, but is preferably 1-50% by mass, and more preferably 1-30% by mass, relative to the total composition, because the effects of the present invention will be better.

In the composition of the present invention, the content of the plasticizer is not particularly limited, but is preferably 1-50% by mass, and more preferably 20-40% by mass, relative to the content of the urethane prepolymer (A) noted above, because the effects of the present invention will be better.

[Catalyst (Curing Catalyst)]

The composition of the present invention preferably contains a curing catalyst because the effects of the present invention will be better.

Specific examples of curing catalysts include, but are not particularly limited to: carboxylic acids such as 2-ethylhexanoic acid and oleic acid; phosphoric acids such as polyphosphoric acid, ethyl acid phosphate, and butyl acid phosphate; bismuth catalysts such as bismuth octylate; tin catalysts such as dibutyltin dilaurate and dioctyltin dilaurate; and tertiary amine catalysts such as 1,4-diazabicyclo[2.2.2]octane, 2,4,6-tris(dimethylaminomethyl) phenols (such as DMP-30), and compounds containing dimorpholinodiethyl ether structures.

The curing catalyst preferably contains a dimorpholinodiethyl ether structure for the purposes of better adhesion.

Dimorpholinodiethyl ether structures are structures in which the basic skeleton is a dimorpholinodiethyl ether.

In dimorpholinodiethyl ether structures, a hydrogen atom on the morpholine ring may be substituted with a substituent. The substituent is not particularly limited. Examples include alkyl groups. Examples of alkyl groups include methyl and ethyl groups.

The curing catalyst can be used alone or in combinations of two or more.

<Content>

In the composition of the present invention, the content of the curing catalyst is not particularly limited, but is preferably 0.05-5.0% by mass, and more preferably 0.1-1.0% by mass, relative to the total composition, because the effects of the present invention will be better.

In the composition of the present invention, the content of the curing catalyst is not particularly limited, but is preferably 0.05-5.0% by mass, and more preferably 0.5-2.0% by mass, relative to the content of the urethane prepolymer (A) noted above, because the effects of the present invention will be better.

[Production Method]

The method for producing the composition of the present invention is not particularly limited; the composition can be produced, for example, by a method in which the principal agent and curing agent are introduced into separate containers and are respectively mixed in a nitrogen gas atmosphere in each container.

[Mixing Ratio]

In the composition of the present invention, the proportion of the curing agent to the principal agent (mixing ratio) is preferably 0.01-1, and more preferably 0.05-0.2, because the effects of the present invention will be better.

[Substrate]

Examples of substrates to which the composition of the present invention can be applied include plastics, glass, rubber, and metals.

The substrate preferably contains an olefinic resin.

Substrates containing an olefinic resin may be obtained from a mixture of an olefinic resin and a filler such as carbon fiber, glass such as glass fillers, talc, calcium carbonate, or alumina.

The plastic may be, for example, a homopolymer, a copolymer, or a hydrogenate. The same is true for rubber.

Specific examples of plastics include olefinic resins such as polypropylene, polyethylene, ethylene-propylene copolymers, COP (cycloolefin polymers), and COC (cycloolefin copolymers);

polyester resins such as polyethylene terephthalate (PET) and polybutylene terephthalate (PBT);

polymethyl methacrylate resins (PMMA resins); polycarbonate resins; polystyrene resins; acrylonitrile-styrene copolymer resins; polyvinyl chloride resins; acetate resins; ABS resins (acrylonitrile-butadiene-styrene resins); and polyamide resins.

The COCs noted above mean cycloolefin copolymers such as copolymers of tetracyclododecene and an olefin such as ethylene.

The COPs noted above mean cycloolefin polymers such as polymers obtained by ring-opening polymerization and hydrogenation of norbornenes.

The plastic may also be a poorly adhesive resin.

The substrate may be surface-treated. Examples of surface treatments include flame treatment, corona treatment, and ITRO treatment. The methods for the above surface treatments are not particularly limited. Examples include conventionally known methods.

The method used to apply the composition of the present invention to a substrate is not particularly limited. Examples include conventionally known methods.

The present invention is exceptionally effective even when the composition of the present invention is applied to a substrate without the use of a primer.

The composition of the present invention can be cured under humid conditions, for example. For example, the composition of the present invention can be cured at 5 to 90° C. and 5 to 95% relative humidity (RH).

[Applications]

The composition of the present invention is useful as an adhesive or sealant for automobiles, construction, and structural purposes. It is in particular useful as an adhesive for automotive resin panels.

EXAMPLES

The present invention is illustrated in further detail by, but is not limited to, the following examples.

[Preparation of Two-Component Urethane-Based Adhesive Composition]

The components shown in Table 1 below were mixed in the proportion (parts by mass) shown in the table to prepare two-component urethane adhesive compositions (principal agent/curing agent=10/1 (mass ratio)).

[Assessment]

The resulting two-component urethane-based adhesive compositions were assessed as follows.

<Workability>

The resulting two-component urethane-based adhesive compositions were used to lay down triangular beads, and the lengths of the strings when the nozzle was pulled up were examined. A length of up to 6 cm was assessed as ○ (excellent workability), and a length of more than 6 cm was assessed as X (poor workability). The results are given in Table 1.

<Machine Dispensability>

Changes in specific gravity that occurred when the resulting two-component urethane-based adhesive compositions were machine-dispensed at high pressure (18 MPa or more) were examined. Machine dispensability was assessed on the basis of the following criteria. ○ indicates exceptional machine dispensability.

○: <0.2% change in specific gravity

X: ≥0.2% change in specific gravity

<Adhesion>

The resulting two-component urethane-based adhesive compositions were applied to substrates (polypropylene containing talc) to form adhesive layers (thickness: 3 mm). Another substrate (polypropylene containing talc) was laminated onto and pressure-bonded to the previously formed adhesive layer, and the laminates were allowed to stand for 3 days at 23° C. and 50% relative humidity, giving laminated members. The adhesive layers of the resulting laminated members were cut with a knife and manually peeled off. The surface of the peeled pieces was visually checked to determine the percent area of cohesive failure (CF) and the percent area of adhesive failure (AF). The resulting laminated members were also subjected to a heat resistance test (test conditions: 336 hours at 90° C., and 1000 hours sat 90° C.) and were then assessed again in the same manner as above (heat resistance). Adhesion was assessed on the basis of the following criteria. The results are given in Table 1.

◎: CF≥95%, AF≤5%

○: CF≥80% to <95%, AF>5% to ≤20%

Δ: CF≥50% to <80%, AF>20% to ≤50%

X: CF<50%, AF>50%

Here, the "CF numerical value" indicates the percent area (%) of cohesive failure, and the "AF numerical value" indicates the percent area (%) of adhesive failure. For example, "CF90AF10" indicates a 90% area of cohesive failure and a 10% area of adhesive failure. The higher the percent area of cohesive failure, the better the adhesion. An adhesion rating of ◎ or ○ after a 1000-hour heat resistance test at 90° C. can be said to indicate exceptional heat-resistant adhesion.

TABLE 1

| | | | Example 1 | Example 2 | Example 3 | Comparative Example 1 | Comparative Example 2 | Comparative Example 3 |
|---|---|---|---|---|---|---|---|---|
| Principal agent | Urethane prepolymer | | 42 | 42 | 42 | 42 | 42 | 42 |
| | Isocyanurate compound | | 2.5 | 2.5 | 2.5 | 2.5 | 2.5 | 2.5 |
| | Silane coupling agent | | 1.0 | 1.0 | 1.0 | 1.0 | 1.0 | 1.0 |
| | Carbon black | | 20.0 | 20.0 | 20.0 | 20.0 | 20.0 | 20.0 |
| | Calcium carbonate | | 18.0 | 18.5 | 18.0 | 18.5 | 18.0 | 18.5 |
| | Resin hollow bodies | | 0.5 | | 0.5 | | | |
| | Glass hollow bodies | | | | | | 0.5 | |
| | Plasticizer | | 15.5 | 15.5 | 15.5 | 15.5 | 15.5 | 15.5 |
| | Curing catalyst | | 0.5 | 0.5 | 0.5 | 05 | 0.5 | 0.5 |
| Curing agent | Polyol | | 60.5 | 60.5 | 60.5 | 60.5 | 60.5 | 60.5 |
| | Resin hollow bodies | | | 5 | 5 | | | |
| | Glass hollow bodies | | | | | | | 5 |
| | Calcium carbonate | | 38.5 | 33.5 | 33.5 | 38.5 | 38.5 | 33.5 |
| | Silane coupling agent | | 0.5 | 0.5 | 0.5 | 0.5 | 0.5 | 0.5 |
| | Curing catalyst | | 0.5 | 0.5 | 0.5 | 0.5 | 0.5 | 0.5 |
| Workability | Stringiness | | ○ | ○ | ○ | X | ○ | ○ |
| Machine dispensability | | | ○ | ○ | ○ | ○ | X | X |
| Adhesion | Initial | | ◎ | ◎ | ◎ | ◎ | ◎ | ◎ |
| | Heat resistance | 336 hours at 90° C. | ◎ | ◎ | ◎ | ○ | ◎ | ◎ |
| | | 1000 hours at 90° C. | ○ | ◎ | ◎ | Δ | ○ | ◎ |

Details of the components shown in Table 1 above are given below.

<Principal Agent>

Urethane prepolymer: A urethane prepolymer having a terminal isocyanate group, obtained by mixing 70 parts by mass of a polyoxypropylene diol (trade name, Sannix PP2000, manufactured by Sanyo Chemical Industries, Ltd.; hydroxyl value: 56; molecular weight: 2,000) with a polyoxypropylene triol (trade name, Sannix GP3000, manufactured by Sanyo Chemical Industries, Ltd.; hydroxyl value: 56; molecular weight: 3,000) and MDI (trade name, Sumidur 44S, manufactured by Sumika Bayer Urethane Co., Ltd.) to an NCO/OH ratio of 2.0, and allowing the mixture to react for 5 hours at 80° C.

Isocyanurate compound: TAKENATE D-376N (an isocyanurate of pentamethylene diisocyanate (PDI), manufactured by Mitsui Chemicals, Inc.) (corresponding to the compound (B) having an isocyanurate ring noted above)

Silane coupling agent: An isocyanate silane obtained by reacting TAKENATE D-165N (biuret of hexamethylene diisocyanate (HDI), manufactured by Mitsui Chemicals, Inc.) with Y9669 (3-(N-phenyl)aminopropyltrimethoxysilane, manufactured by Momentive Performance Materials Japan LLC)

Carbon black: #200MP manufactured by NIPPON STEEL Carbon Co., Ltd. (HAF grade carbon furnace)

Calcium carbonate: KALFAIN 200, manufactured by Maruo Calcium Co., Ltd. (surface-treated light calcium carbonate)

Resin hollow bodies: Airpolic EY-01 (structure: porous (sponge-like); material: cross linked polyester resin; particle density=apparent density: 0.47 g/cm$^3$; bulk density: 0.27 g/cm$^3$; average particle size: 60 μm; compressive strength: 30 MPa; manufactured by Shiraishi Kogyo Kaisha, Ltd.) (hollow bodies having a compressive strength of 10 MPa or more, which thus corresponded to the hollow bodies (E) noted above)

Glass hollow bodies: Glass Bubbles K25 (material: glass; particle density=apparent density: 0.25 g/cm$^3$; bulk density: 0.16 g/cm$^3$; average particle size: 55 μm; compressive strength: 5 MPa; manufactured by 3M) (hollow bodies having a compressive strength of less than 10 MPa, which thus did not correspond to the hollow bodies (E) noted above)

Plasticizer: DINP (diisononyl phthalate), manufactured by J-PLUS Co., Ltd.

Curing catalyst: UCAT-660M (DMDEE (dimorpholinodiethyl ether)), manufactured by San-Apro Ltd.

<Curing Agent>

Polyol: PREMINOL 7001K (polyoxypropylene triol (EO (ethylene oxide) terminal); hydroxyl value: 28 mgKOH/g; molecular weight: 6,500), manufactured by Asahi Glass Co., Ltd.

Resin hollow bodies: Same as resin hollow bodies used above in principal agent

Glass hollow bodies: Same as glass hollow bodies used above in principal agent

Calcium carbonate: Same as calcium carbonate used above in principal agent

Silane coupling agent: Same as silane coupling agent used above in principal agent Curing catalyst: Same as curing catalyst used above in principal agent <Summary of Table>

Table 1 shows that exceptional workability, machine dispensability, and heat-resistant adhesion were demonstrated by Examples 1 through 3, in which at least the principal agent or the curing agent contained hollow bodies (E). Among them, better heat-resistant adhesion was demonstrated by Examples 2 and 3, in which the curing agent contained the hollow bodies (E).

On the other hand, the workability, machine dispensability, and heat-resistant adhesion were all poor in Comparative Examples 1 through 3, which did not contain any hollow bodies (E).

The invention claimed is:

1. A two-component type of urethane-based adhesive composition, comprising:

a principal agent comprising a urethane prepolymer (A) that has a terminal isocyanate group; a compound (B) that has an isocyanurate ring; and a silane coupling agent (C); and a curing agent comprising a compound (D) that has 2 or more active hydrogen-containing groups per molecule, wherein (i) the principal agent or curing agent further comprises hollow bodies (E) having a compressive strength of 10 MPa or more, and (ii) the content of the hollow bodies (E) is 0.05 to 5% by mass relative to the entire composition.

2. The two-component type of urethane-based adhesive composition according to claim 1, wherein the compound (B) is an isocyanurate of an aliphatic isocyanate.

3. The two-component type of urethane-based adhesive composition according to claim 1, wherein the urethane prepolymer (A) is obtained by mixing and reacting a polyether polyol that has a molecular weight of 500 to 20,000 with an aromatic polyisocyanate, where the proportion of the isocyanate groups of the aromatic polyisocyanate ranges from 1.5 to 2.5 mols per mol of the polyether polyol hydroxyl groups.

4. The two-component type of urethane-based adhesive composition according to claim 1, wherein the principal agent or curing agent furthermore comprises carbon black or calcium carbonate.

5. The two-component type of urethane-based adhesive composition according to claim 2, wherein the urethane prepolymer (A) is obtained by mixing and reacting a polyether polyol that has a molecular weight of 500 to 20,000 with an aromatic polyisocyanate, where the proportion of the isocyanate groups of the aromatic polyisocyanate ranges from 1.5 to 2.5 mols per mol of the polyether polyol hydroxyl groups.

6. The two-component type of urethane-based adhesive composition according to claim 2, wherein the principal agent or curing agent furthermore comprises carbon black or calcium carbonate.

7. The two-component type of urethane-based adhesive composition according to claim 3, wherein the principal agent or curing agent furthermore comprises carbon black or calcium carbonate.

8. The two-component type of urethane-based adhesive composition according to claim 5, wherein the principal agent or curing agent furthermore comprises carbon black or calcium carbonate.

* * * * *